United States Patent [19]

Pierce et al.

[11] Patent Number: 5,299,810
[45] Date of Patent: Apr. 5, 1994

[54] VEHICLE SIMULATOR INCLUDING CROSS-NETWORK FEEDBACK

[75] Inventors: Mark S. Pierce, Palo Alto; Milton H. Loper, III, Mountain View; Dennis D. Harper, Campbell; David S. Akers, Fremont; Samuel Lee, San Jose, all of Calif.

[73] Assignee: Atari Games Corporation, Milpitas, Calif.

[21] Appl. No.: 902,482

[22] Filed: Jun. 23, 1992

Related U.S. Application Data

[63] Continuation of Ser. No. 674,684, Mar. 21, 1991, abandoned.

[51] Int. Cl.$^5$ .............................................. A63F 9/22
[52] U.S. Cl. ................................. 273/434; 273/442; 434/69
[58] Field of Search ............... 273/434, 435, 436, 437, 273/438, 442, 454, 460, 85 G; 434/38, 43, 44, 46, 59, 69

[56] References Cited

U.S. PATENT DOCUMENTS

| | | | |
|---|---|---|---|
| 2,148,828 | 2/1939 | Myers | 273/442 X |
| 3,193,946 | 7/1965 | Patuano | 273/442 X |
| 4,030,208 | 6/1977 | Carver et al. | 434/43 X |
| 4,418,911 | 12/1983 | Bowers et al. | 273/85 G |
| 4,461,470 | 7/1984 | Astroth et al. | 273/85 G X |
| 4,478,407 | 11/1981 | Manabe | 434/43 X |
| 4,887,966 | 12/1989 | Gellerman | 273/438 X |
| 4,960,117 | 10/1990 | Moncrief et al. | 273/85 G X |

FOREIGN PATENT DOCUMENTS

| | | |
|---|---|---|
| 0387438 | 9/1990 | European Pat. Off. . |
| 9003627 | 4/1990 | PCT Int'l Appl. . |
| 918705 | 2/1963 | United Kingdom . |

OTHER PUBLICATIONS

Onde Electrique, vol. 68, No. 5, Sep. 1988, paris FR pp. 67-72; Couturier, Alain; 'Projection D'Images-Tubes a Haute Brillance Projecteurs Lasers' see p. 68, column 1, paragraph 3-p. 72, column 1, paragraph 2.
Brochure for Cisco Heat, All American Police Car Race, by Jaleco (1990).
Brochure for "OutRun", by Sega (1986).
Brochure for "Hard Drivin'", by Atari Games Corporation (1988).

*Primary Examiner*—William H. Grieb
*Attorney, Agent, or Firm*—Knobbe, Martens, Olson & Bear

[57] ABSTRACT

A vehicle simulator has tandem surfaces for supporting first and second users, who "drive" respective first and simulated vehicles through a simulated space. A solenoid is mounted underneath each surface for selectively impacting the associated surface to give the user the sensation of having his simulated vehicle hit by a projectile.

Each user sits in front of a video monitor, and each monitor is electrically connected to a computer. Each computer has a "map" of a simulated space stored in its electronic memory, and the computers are linked through a common RAM. The computers cause their monitors to display a changing video image of the simulated space to model motion of the simulated vehicles through the space, in response to signals from controls that can be manipulated by the operators.

Each user controls a trigger which can be pushed to initiate the motion of a simulated projectile through the simulated space toward the user's vehicle. The computer of the shooter sends a signal to the RAM to indicate that s hot has been initiated. The computer of the user being shot accesses the common RAM each game cycle to determine whether a shot has been fired, and if so, computes whether the shot has "hit" the associated vehicle. If the computer determines that a "hit" has occurred, the computer activates the solenoid of the seat of the user being shot to thump the seat and thereby model the effects of a hit on the vehicle.

21 Claims, 4 Drawing Sheets

VEHICLE SIMULATOR INCLUDING CROSS-NETWORK FEEDBACK

This application is a continuation of application Ser. No. 07/674,684, filed Mar. 21, 1991, now abandoned.

FIELD OF THE INVENTION

The present invention relates generally to vehicle simulators. More particularly, the present invention relates to interactive vehicle simulators which can be operated by one user or more than one user. The present invention particularly, though not exclusively, relates to vehicle simulators which model certain effects of battle or other physical interaction between the simulated vehicles of the users.

BACKGROUND OF THE TECHNOLOGY

The use of video arcade games which simulate the operation of vehicles, such as race cars and aircraft, for entertainment is becoming widespread. Also, apparatus which simulate the operation of vehicles are increasingly being used as training devices for government and industry vehicle operators. Such apparatus can be programmed to realistically model the motion of a vehicle through two or three-dimensional space, and can also provide relatively realistic simulation of the control of the vehicle. Importantly, training on simulators is safer and more cost-effective than training with real vehicles.

Typically, a vehicle simulator has a computer which displays on a monitor a constantly changing video picture of a simulated three dimensional space. The "view" presented on the monitor is ordinarily the view of the simulated space as would be seen from the driver's seat of the simulated vehicle. Thus, as the simulated vehicle "moves" through the simulated space, the video display is constantly updated by the computer to model the motion of the vehicle.

Preferably, the computer realistically models the simulated space and effects of simulated objects in the space upon the simulated vehicle. For example, in a video-based simulator which models the effects of combat on a simulated vehicle moving through the simulated space, it is desirable to model the effects of the combat on the vehicle and to provide an indication of these effects to the operator of the simulated vehicle.

Ideally, for greater realism, these indications are multi-sensory. In other words, the indications of combat ideally include visual indications, e.g., flashes of light on the monitor to indicate explosions, as well as aural indications (e.g., loud bangs and explosions). Moreover, some vehicle simulators have provided indications of vehicle motion which include tactile indications, e.g., motion of the operator's seat in response to actions of the operator, in order to model the effects of motion on the vehicle.

It is desirable, however, to provide multi-sensory indications of events which do not simply depend on some activity by the operator to initiate the event (e.g., the effects of wind on a speeding vehicle). More particularly, it is desirable to provide multi-sensory indications of events that are initiated by another operator, or the computer. For example, in a combat simulator, when a first operator initiates combat action which affects a second operator's simulated battle platform, it is desirable that multisensory indications of the combat be provided to the second operator. The present invention recognizes that in the combat context, a simulator can initiate jolts or thumps to the seat of the operator, to model the effects of a hit on the operator's simulated vehicle by a projectile fired from another simulated vehicle. Also, the present invention recognizes that a simulator can be provided which can initiate jolts or thumps to the seat of the operator, to model the effects of a collision, induced by a source other than the activities of the operator of the simulated vehicle, between the simulated vehicle and an object.

Accordingly, it is an object of the present invention to provide a vehicle simulator which models the effects of combat on a simulated vehicle.

It is a further object of the present invention to provide a vehicle simulator which models the effects of a collision, such as a projectile striking a vehicle, by causing a physical impact on the operator of the simulator.

Another object of the present invention is to provide a vehicle simulator which is easy to use and cost-effective to manufacture.

SUMMARY OF THE INVENTION

A vehicle simulator has first and second tandem surfaces which are seats for first and second users of the simulator. The users can sit side by side and "drive" respective simulated vehicles by appropriately manipulating first and second controls to generate respective first and second control signals. These control signals are sent to respective first and second computers. The computers determine the positions of their associated vehicles within the simulated space once each computational cycle (i.e., about once every one-tenth of a second) based upon the control signal which is input to the computer.

A first video monitor is positioned in front of one user and electrically connected to the first computer, and a second video monitor is positioned in front of the other user and electrically connected to the second computer. The monitors provide a visual indication to the users of the position and motion of their respective vehicles within the simulated space. The image presented on each monitor is updated every computational cycle by the associated computer, to present a changing video image of the simulated space and thereby model motion of the associated vehicle through the space.

More particularly, each of the computers which are associated with the monitors has a "map" of the simulated space stored in its electronic memory. The first computer calculates the position of the first simulated vehicle within the simulated space every computational cycle, based upon the first control signal. Also, the second computer calculates the position of the second simulated vehicle within the simulated space every computational cycle, based upon the second control signal. Additionally, each computer determines the positions within the space of simulated drones that are controlled by the particular computer. Accordingly, each computer is associated with one of the simulated vehicles and at least one computer-controlled drone.

The computers generate respective first and second position signals which are representative of the position and orientation of the vehicle that is associated with the particular computer. Position signals are also generated which are representative of the positions and orientations of the drones that are controlled by the particular computer. Once each computational cycle, each computer sends its position signals to a common random access memory (RAM) which is electrically connected to each computer. After sending its position signals to the RAM, each computer polls the RAM to determine the positions and orientations of the vehicle and drones controlled by the opposite computer. Then, based upon its own position signals plus the position signals that are stored in the RAM from the other computer, each computer causes its associated monitor to display an image of the space, including both vehicles and the computer-controlled drones, as would be seen from the vehicle of the particular computer.

Furthermore, each user can "shoot" the other user's vehicle by depressing a trigger to initiate the motion of a simulated projectile toward the other user's vehicle. As envisioned by the present invention, the simulated projectile can model a burst of electromagnetic energy, a bullet, artillery shell, or other combat weapon. When a "shot" is initiated, the computer associated with the shooting vehicle sends a signal to the RAM that is representative of the position and orientation of the projectile. This signal is detected by the computer that is associated with the vehicle being shot when the computer polls the RAM during the next succeeding computational cycle.

If desired, the simulator can be operated in a single player mode, wherein a single user can "play" against one of the computers that has been activated. Preferably, the activated computer is the computer associated with the monitor that is directly in front of the computer. In the single operator mode, the user shoots drones that are controlled by the activated computer. Also, the computer can cause the drones to shoot projectiles toward the simulated vehicle "driven" by the user. Processing of information representing the projectiles, drones, and vehicle is accomplished by the activated computer.

Whether in the single player or two-player mode, upon ascertaining that a shot has been fired at its associated vehicle, the computer determines whether the position of the simulated projectile is coincident with the position of the associated vehicle. If coincidence is determined to have occurred, the computer generates a "hit" signal. If coincidence has not occurred, the computer stores the position of the projectile in memory and, during the next computational cycle, advances the projectile through the simulated space in accordance with the reported firing position and orientation of the projectile. The computer also advances the associated vehicle through the simulated space in accordance with the user-generated command signal. Then, the computer again determines whether coincidence has occurred between the projectile and the vehicle associated with the computer.

In the event that a "hit" has occurred, the particular computer causes the seat of the associated user to be impacted to model the effects of a hit on a real vehicle. Specifically, a solenoid is mounted beneath each seat, and each solenoid can be controlled by its associated computer to thump the seat. More specifically, each solenoid includes a plunger which is movable from a distanced position, wherein the plunger is spaced from the seat, to an impact position, wherein the plunger contacts the seat. The computer sends the "hit" signal to the solenoid to cause the plunger to thump the seat of the associated user to give the user a tactile sensation of the effects of a hit on his vehicle.

Other tactile indications of simulated impacts are also envisioned by the present invention. For example, the solenoid can be located on the backrest of the seat of the user, to thump the user's back upon generation of a "hit" signal. Moreover, devices other than solenoids can be used to generate the tactile indication of a "hit". For example, a motor can be attached to the seat of the user to vibrate the seat when a "hit" signal is generated.

As further envisioned by the present invention, a "hit" signal to energize the solenoid can be generated as a result of activity other than projectile firings. For example, a computer can generate a "hit" signal to energize the associated solenoid of a first user when the simulated vehicle operated by a second user rams the simulated vehicle operated by the first user.

Further details of the structure and operation of the present invention can best be understood by reference to the accompanying drawings, in which like numerals refer to like parts, as described below.

DETAILED DESCRIPTION OF THE PREFERRED EMBODIMENT

Figure 1:
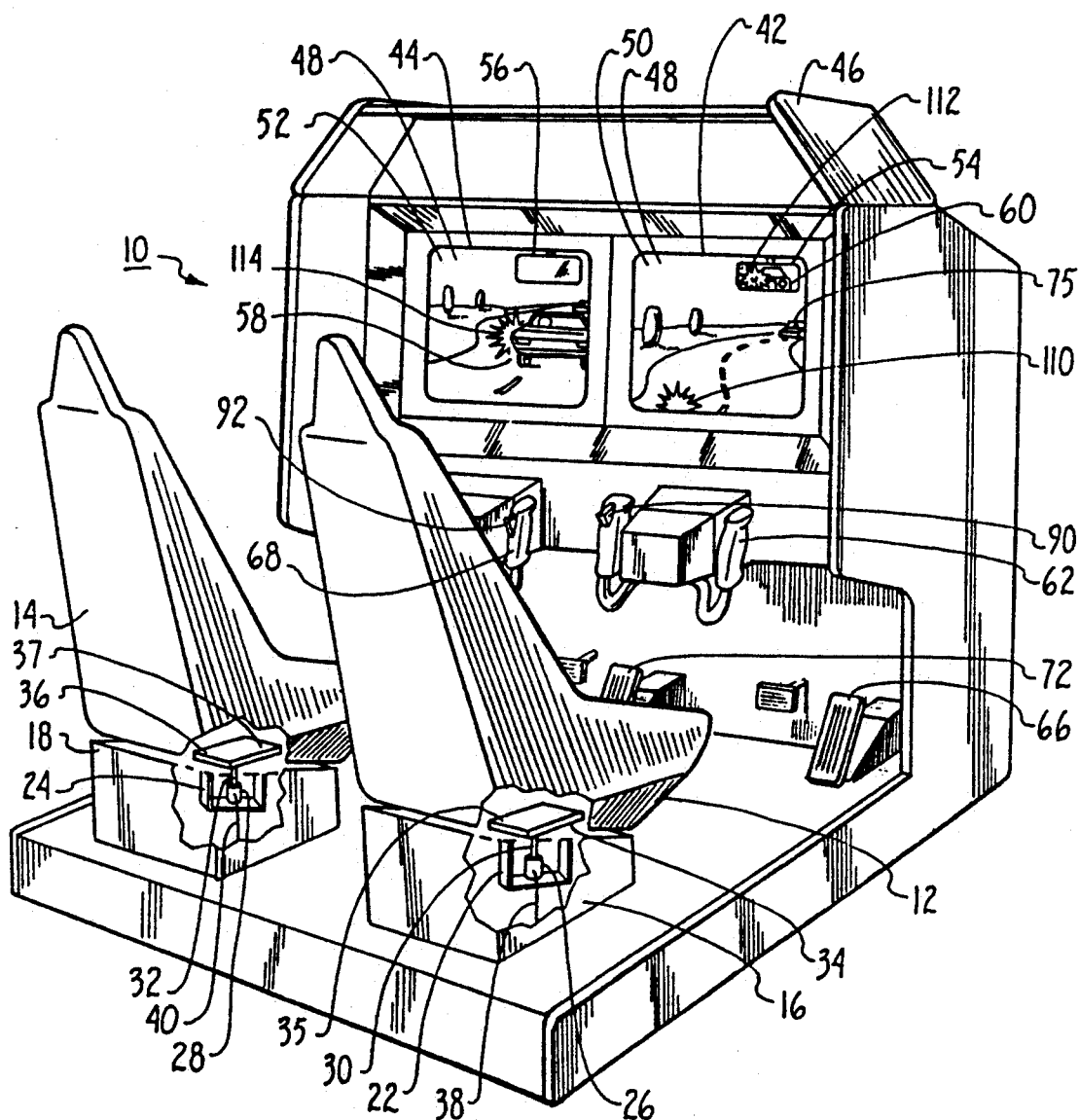
FIG. 1 is a perspective view of one presently preferred embodiment of the novel vehicle simulator of the present invention, with portions broken away for clarity.

Referring initially to FIG. 1, a vehicle simulator is shown, generally designated 10. As shown, the simulator 10 has two surfaces which are represented by the seats 12, 14 in FIG. 1. The seats 12, 14 are mounted in tandem on respective bases 16, 18, and the bases 16, 18 are mounted on a platform 20. As shown, brackets 22, 24 are respectively connected to the bases 16, 18 by any means well-known in the art, such as welding or bolting the brackets 22, 24 to the bases 16, 18. FIG. 1 further shows that two solenoids 26, 28 are mounted respectively on the brackets 22, 24. In one preferred embodiment, the solenoids 26, 28 are type 3000-M-1 solenoids manufactured by Dormeyer Industries. The solenoid 26 has a plunger 30 slidably attached thereto, and the solenoid 28 has a plunger 32 slidably attached thereto. Additionally, a respective wooden block 34, 36 is fixedly attached to the seats 12, 14. It will be appreciated that the blocks 34, 36 can be replaced with metal or plastic plates (not shown). If desired, an air space 35 can be established between the upper surface of the block 34 and the seat 12. Also, an air space 37 can be established between the upper surface of the block 36 and the seat 14.

In accordance with the present invention, each of the plungers 30, 32 of the solenoids 26, 28 is movable between a spaced position, wherein the plunger 30, 32 is distanced from its respective wooden block 34, 36, and an impact position, wherein the plunger 30, 32 is in contact with its respective wodden block 34, 36. As shown in FIG. 1, the plunger 30 is in the impact position, while the plunger 32 is in the spaced position. It is to be appreciated in reference to FIG. 1 that one or both of the solenoids 26, 28 can be energized through a respective electrical line 38, 40. Taking the solenoid 26 as an example, the solenoid 26 can be energized to cause its plunger 30 to strike the block 34 and thereby generate a "thump" which can be felt by a user (not shown) sitting in the seat 12.

While the disclosure above discusses one means by which the seat 12 can be physically impacted, namely, by the solenoid 26, it is to be appreciated that other means can be provided to impact the seat 12. For example, a motor (not shown) can be appropriately engaged with the seat 12 to vibrate the seat 12. Moreover, the solenoid 26 can be mounted on other areas of the seat 12 to impact the other areas. If desired, additional solenoids (not shown) can be mounted on the seat 12 to provide means for impacting the seat 12 in a plurality of locations.

Still referring to FIG. 1, a video monitor 42 and a video monitor 44 are shown positioned on a console 46 in front of the seats 12, 14 at about eye level to users (not shown) who can sit in the seats 12, 14. In reference to FIG. 1, each monitor 42, 44 respectively presents a changing split-screen video image of a simulated space 48 as would be seen from a vehicle being simulated, to model motion of the particular vehicle through the space 48. More particularly, the monitors 42, 44 present respective changing images of main sectors 50, 52 of the space 48, and changing rear-view mirror images of minor sectors 54, 56 of the simulated space 48. Hence, the two monitors 42, 44 present images of the simulated space 48 as would be seen from two respective vehicles.

The main sectors 50, 52 are the sectors of the space 48 as would be seen from the driver's seat looking forward of the respective vehicles being simulated. On the other hand, the minor sectors 54, 56 are the sectors of the space 48 as would be seen looking in the rear-view mirrors of the vehicles being simulated. In FIG. 1, a user (not shown) can sit in the seat 12 and "drive" the simulated vehicle 58, displayed in the main sector 52 on the monitor 44. Furthermore, another user (not shown) can sit in the seat 14 and "drive" the simulated vehicle 60, which is displayed in the minor sector 54 on the monitor 42. Thus, it will be appreciated that in the exemplary scenario shown in FIG. 1, the vehicle 58 is in front of the vehicle 60, relative to the orientations of the vehicles 58, 60.

Still referring to FIG. 1, control means are shown for generating signals for controlling the simulated motion of the vehicles 58, 60 through the simulated space 48. It is to be appreciated that the control means used by the present invention can be any means well-known in the art of video arcade games. More particularly, a steering handle 62 is rotatably mounted on the console 46 in front of the seat 12 to generate a signal representative of the orientation of the vehicle 58 relative to the simulated space 48. Likewise, a steering handle 68 is rotatably mounted on the console 46 in front of the seat 14 to generate a signal representative of the orientation of the vehicle 60 relative to the simulated space 48.

Figure 2:
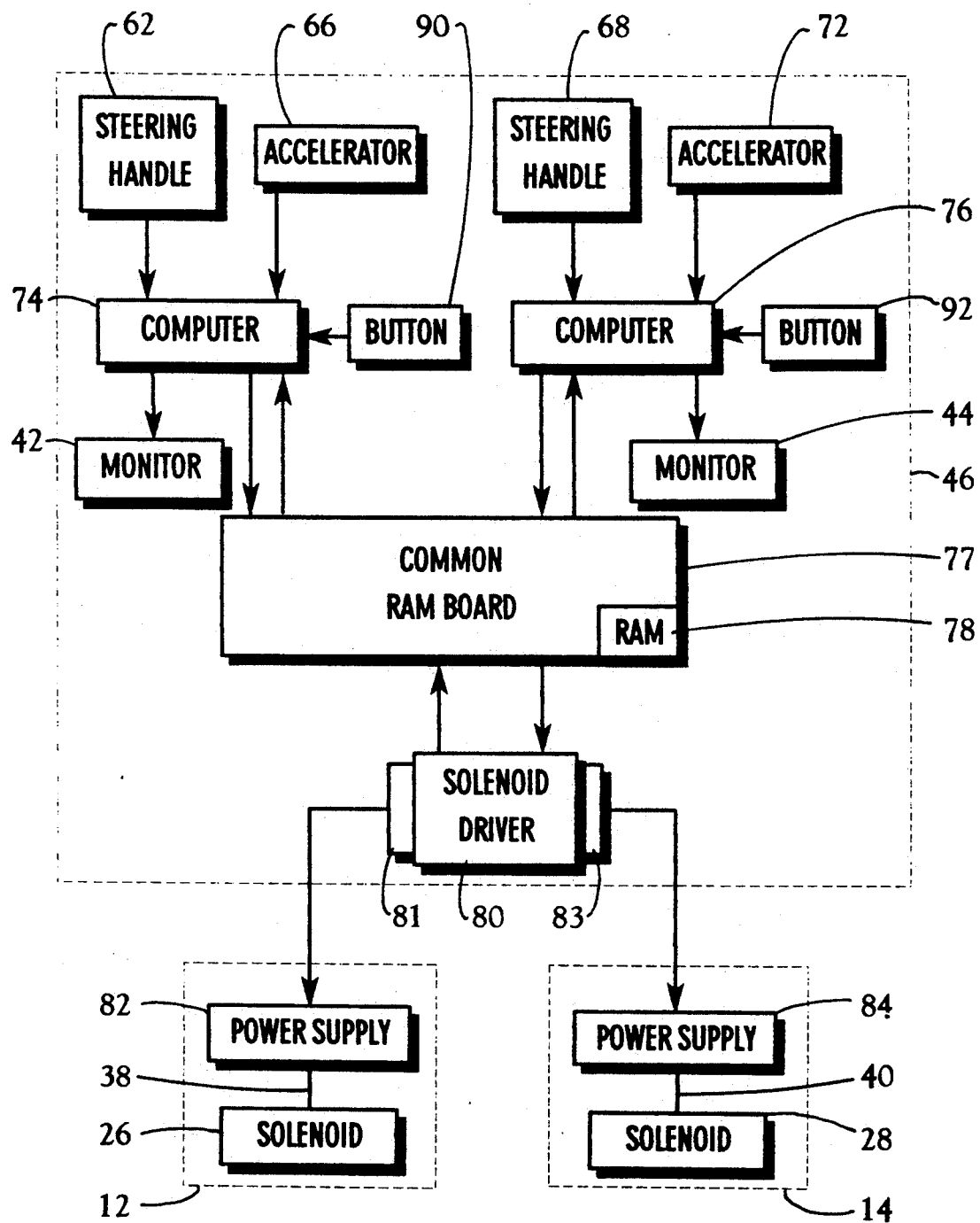
FIG. 2 is a block diagram of a presently preferred embodiment of the electrical components of the novel vehicle simulator of the present invention.

Now referring to FIG. 2, the details of the electrical components of the simulator 10 are shown to include a computer 74 which is mounted in the console 46 and which is electrically connected to the monitor 42 for causing the monitor 42 to present a changing video display of the simulated space 48. Accordingly, the computer 74 contains in electronic memory a map of the space 48. Also, the computer 74 is electrically connected to signal generating devices that are well-known in the art, such as potentiometers (not shown), which are operatively engaged by well-known means with the controls associated with the vehicle 58. More specifically, in one preferred embodiment, the computer 74 is electrically connected to the position sensors that are associated with the steering handle 62 and accelerator pedal 66. These sensors generate electrical control signals that are representative of the positions of the steering handle 62 and accelerator pedal 66. The electrical control signals are in turn conducted to the computer 74.

Moreover, a computer 76 is mounted on the console 46 and is electrically connected to the monitor 44 for causing the monitor 44 to display a changing video image of the simulated space 48. Accordingly, the computer contains in its electronic memory a map of the space 48. Also, the computer 76 is electrically connected to signal generating devices that are well-known in the art, such as potentiometers (not shown), which are operatively engaged by well-known means with the controls associated with the vehicle 60. More specifically, in one preferred embodiment, the computer 76 is electrically connected to the position sensors that are associated with the steering handle 68 and accelerator pedal 72. These sensors generate electrical control signals that are representative of the positions of the steering handle 68 and accelerator pedal 72. The electrical control signals are in turn conducted to the computer 76. In one preferred embodiment, the computers 74, 76 are type M68000-14 microprocessors manufactured by Motorola Corporation.

Still referring to FIG. 2, a common random access memory (RAM) board 77 is shown mounted on the console 46 and electrically connected to the computers 74, 76. Preferably, RAM board 77 includes a suitable dual ported 2K×8 bit semiconductor RAM 78. As shown in FIG. 2, the RAM board 77 is electrically connected to a solenoid driver assembly 80 which is also mounted on the console 46. As shown, solenoid driver assembly 80 includes a first driver 81 and a second driver 83. As further shown in FIG. 2, the first driver 81 of the solenoid driver 80 is electrically connected to a first 110 volt alternating current (ac) power supply 82, and the second solenoid driver 83 is electrically connected to a second 110 volt ac power supply 84. The power supplies 82, 84 are in turn mounted in the bases 16, 18. The power supply 82 is electrically connected to the solenoid 26 for energizing the solenoid 26, and the power supply 84 is electrically connected to the solenoid 28 for energizing the solenoid 28.

As envisioned by the present invention, the solenoid drivers 81, 83 are any suitable devices which can convert a signal from the respective computers 74, 76 through the common RAM board 77 to an amplified command signal which can be sent to one or both of the power supplies 82, 84 to cause the power supplies 82, 84 to energize their respective solenoids 26, 28.

In the operation of the simulator 10, it is to be understood that the present invention can simulate the operation of a vehicle in either of two modes, single user or two user. Furthermore, the present invention contemplates the addition of a third, fourth, or more video monitors (not shown) with associated computers (also not shown) to provide the capability to operate the simulator 10 in three-, four-, or more-user modes. For clarity of illustration, however, only the single-user and two-user modes are disclosed herein. It is to be further understood that the operation of the simulator 10 in modes wherein more than two users can play is in all essential respects a straightforward extrapolation of the operation of the two-user mode of simulator 10.

Figure 3:
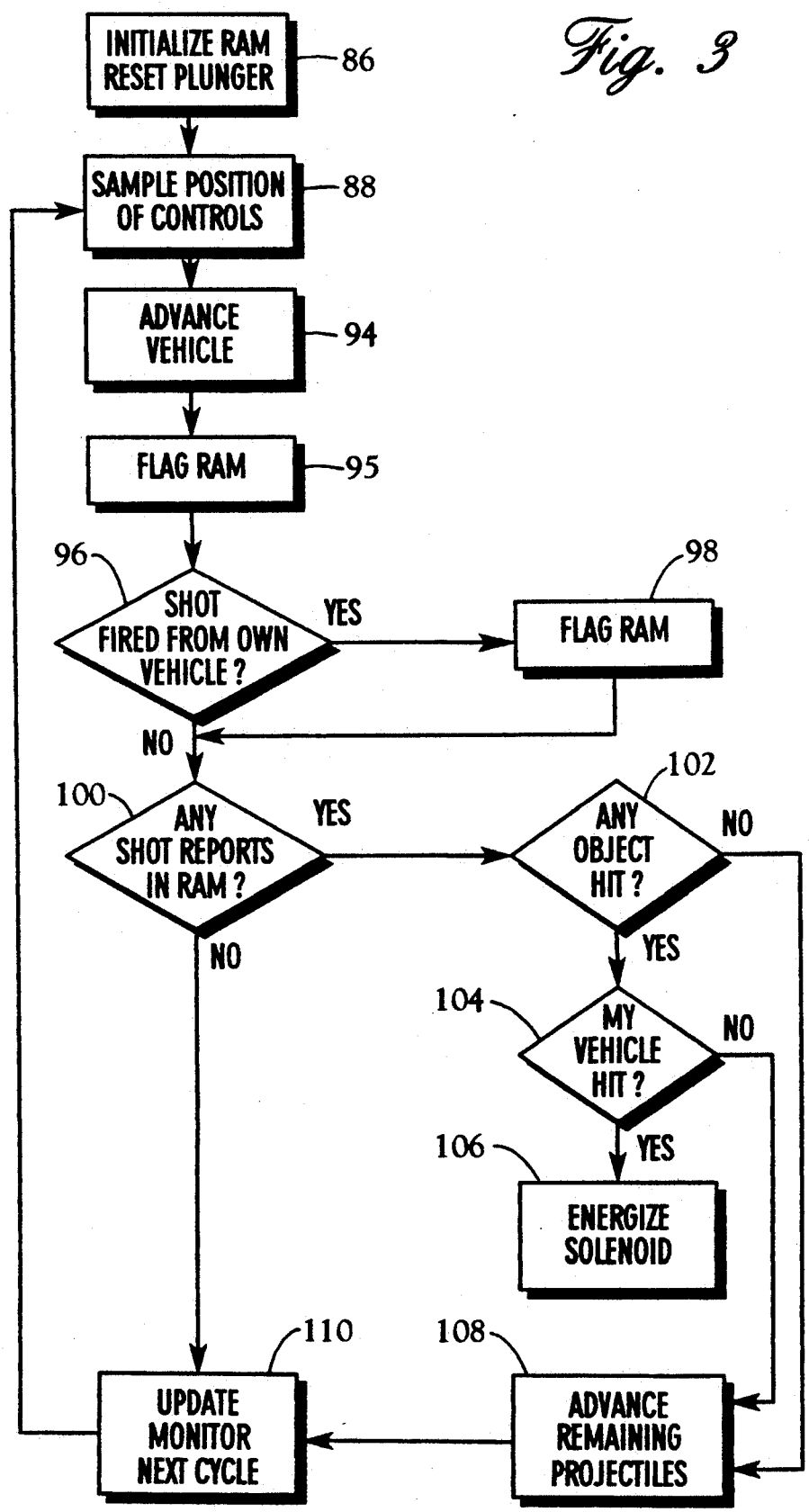
FIG. 3 is a flow chart showing the operation of each computer of the novel vehicle simulator of the present invention during one computational cycle in the two-user mode.

In describing the two-user mode of the simulator 10, reference is made to FIG. 3, which shows the steps of one computational cycle of the simulator lo for the computer 74. It is to be understood that the logic followed by computer 76 during each computational step is substantially the same as the logic follwed by computer 74 disclosed below.

As indicated at block 86 in FIG. 3, upon energization of the simulator 10, the common RAM 78 is initialized and signals the solenoid drivers 81, 83 to activate the power supplies 82, 84 to move the plungers 30, 32 of the solenoids 26, 28 to their spaced positions. Then, the logic of the computer 74 moves to block 88. At block 88, the computer 74 samples the signals from the controls 62, 66, 68, 72 that are representative of the desired motion of the vehicles 58, 60 within the space 48.

More particularly, the user sitting in the seat 12 can manipulate the steering handle 62 and accelerator pedal 66 as appropriate to generate control signals representative of the desired motion of the simulated vehicle 58. These signals are sampled by the computer 74 at block 88. Likewise, the user sitting in the seat 14 can manipulate the steering handle 68 and accelerator pedal 72 as appropriate to generate a control signal representative of the desired motion of the simulated vehicle 60. These signals are sampled by the computer 76 at block 88.

Furthermore, FIG. 1 shows that the handles 62, 68 have firing triggers 90, 92 reciprocally attached thereto. Each trigger 90, 92 is operably associated with an apprpriate signal generator well-known in the art, such as a contact switch, that can generate an electrical "shoot" signal whenever the trigger 90, 92 is depressed. The "shoot" signal so generated is representative of the firing of a projectile from the associated vehicle. As shown in FIG. 2, the "shoot" signals from the triggers 90, 92 are respectively sent to the computers 74, 76.

The computer 74 next moves to block 94, wherein the computer 74 advances its associated vehicle 58 within the space 48 in response to the control signals from the user-manipulated controls. More particularly, based upon its input control signals, the computer 74 establishes the orientation and speed of its respective vehicle 58. Also, in the two-user mode, each computer 74, 76 controls at least one respective drone vehicle (only the drone 75 that is controlled by the computer 74, shown in FIG. 1) in accordance with a predetermined program. Accordingly, each computer 74, 76 advances its drone within the space 48, and sends a signal to the common RAM 78 representative of the position and orientation of the particular drone.

The computer 74 also stores data representative of the position and orientation of the vehicle 58 and the computer-controlled drones as they have advanced a distance corresponding to the product of the simulated speed of the particular vehicle 58 or drone and the time period of one cycle, in a direction corresponding to the orientation of the particular vehicle 58 or drone.

After advancing the vehicle 58 and drones, the logic of the computer 74 proceeds to block 95, wherein the computer 74 sends a signal to the common RAM 78 representative of the position and orientation of its associated vehicle 58. The computer 74 flags the RAM 78 to store the signal in the RAM 78 for subsequent access to the vehicle 58 position data by the computer 76. Likewise, the computer 76 sends a signal to the common RAM 78 which is representative of the position and orientation of its associated vehicle 60, and flags the RAM 78 to store this data. While at the block 95, the computer 74 ascertains the position of the vehicle 60, as reported by the computer 76.

The computer 74 next proceeds to block 96, wherein the computer 74 determines whether its associated user has depressed the firing trigger 90. If the firing trigger 90 has been depressed, the computer 74 sends a "shot fired" signal to the common RAM 78 representative of the position, orientation, and firing platform (e.g., vehicle 58) of the fired projectile, as indicated at the block 98, and flags the RAM 78 to store this data. Moreover, the computer 74 can, if desired, initiate a projectile firing from the drone 75 that is controlled by the computer 74 at any convenient step in the process described herein.

From block 98 or, if the computer 74 determined that no shot was fired from the vehicle 58, from block 96, the computer 74 moves to block 100. At block 100, the computer 74 polls the RAM 78 to determine whether any projectiles are currently "active". Specifically, at block 100, the computer 74 polls the RAM 78 to determine whether any shot was fired by the vehicle 60 associated with the opposite computer 76, or by any of the computer-controlled drones, or by the vehicle 58 controlled by the computer 74, either in the current computational cycle or in any previous computational cycles. More specifically, each projectile that has been fired has a predetermined "lifetime", i.e., each projectile can exist for a predetermined number of computational cycles after it has been fired, after which time the projectile is deleted from the space 48. In accordance with the present invention, the computer 74 stores, in its memory, the positions of the projectiles obtained from the RAM 78.

In the event that the computer 74 determines, at block 100, that one or more projectiles exist in the space 48, the computer 74 moves to block 102. At block 102, the computer 74 determines whether any projectiles have hit any "allowed" objects in the space 48. More particularly, the computer 74 ascertains the firing platform of each projectile, and then compares the position of each projectile in the space 48 with the position of each object in the space 48, including the vehicles 58, 60, and computer-controlled drones, that is "allowed" to be hit by the particular projectile. In accordance with the present invention, a projectile is "allowed" to hit the vehicle which opposes the vehicle that fired the particular projectile. Also, a projectile is allowed to hit one of the computer-controlled drones. A projectile is not, however, allowed to hit the vehicle which fired the particular projectile.

To determine whether the projectile has hit an "allowed" object, the computer 74 in block 102 compares the position of the projectile with the positions of the vehicles 58, 60 and the drone vehicles. If any portion of the projectile coincides with any portion of one of the "allowed" objects, the computer 74 registers a hit on the particular object and stores the hit registration in memory.

In the event that the computer 74 determines that a hit has occurred, the computer 74 moves to block 104. At block 104, the computer 74 determines whether the hit object was the vehicle 58. If the hit object was the vehicle 58, the computer 74 moves to block 106, wherein the computer 74 causes the solenoid 26 to be energized. More specifically, the computer 74 sends a signal through the RAM board 77 to the solenoid driver 81, to cause the solenoid driver 81 to activate the power supply 82. When power supply 82 is activated to energize the solenoid 26, the plunger 30 is moved from its spaced position to its impact position to strike the wooden block 34. The impact of the plunger 30 against the block 34 is transferred to the seat 12, to give the user who is sitting in the seat 12 a sensation of being thumped.

From block 106, or block 104 if the vehicle 58 has not been hit, or block 102 if no object was hit, the computer 74 proceeds to block 108. At block 108, the computer 74 conducts calculations and produces data which advances the positions of any projectiles remaining in the space 48 a distance from the projectile's last position corresponding to the simulated speed of the projectile multiplied by the time period of one game cycle, in a direction corresponding to the orientation of the projectile. In other words, the computer 74 advances the positions of all fired projectiles which have not hit an "allowed" object in the space 48 and have not exceeded their lifetimes.

From block 108, or, if no shot reports have been reported in the RAM 78, from block 100, the computer 74 proceeds to block 110. At block 110, the computer 74 updates the monitor 42 to reflect the determinations and calculations conducted by the computer 74 in the computational cycle. More specifically, the computer 74 causes the monitor 42 to present an image of the space 48 that reflects the updated positions of the vehicles and drones within the space 48, as calculated by the computer 74 at block 94.

Additionally, the computer 74 updates the monitor 42 to reflect the firing of a projectile and, if appropriate, the imapct of a projectile on an object in the space 48. More particularly, when the computer 74 determines, in block 100, that a projectile has been fired by the opposing vehicle 60, the computer 74 updates the monitor 42 to cause the monitor 42 to display an image of a flash of light on the icon representing the vehicle 60. This is to provide a visual indication of the projectile launch to the user sitting in the seat 12 and "driving" the vehicle 58. Thus, the image of the flash of light 112 in the "rearview mirror" of the vehicle 58 shown in FIG. 1 indicates that the vehicle 60 has just launched a projectile toward the vehicle 58.

Furthermore, if the computer 74 has determined, at block 102, that the opposing vehicle or a drone was hit, the computer 74 causes the monitor 42 to display the image of a flash of light on the icon that represents the particular drone or vehicle. In the example depicted in FIG. 1, the computer 76 has determined that a projectile launched by the vehicle 60 associated with the computer 76 has hit the vehicle 58. Accordingly, FIG. 1 shows that the monitor 44 has displayed the image 114 of a flash of light on the icon representing the vehicle 58, to indicate that the vehicle 58 has been hit by a projectile. After the computer 74 has updated the monitor 42 at block 110, the computer 74 commences another computational cycle by returning to block 88.

While the discussion above focussed on the two-user mode of operation of the simulator 10, it is to be understood that a single user can "play" against one of the computers 74, 76. In the single-user mode, the computer 74 functions essentially as disclosed above, with the exception that the computer 74 controls a plurality of (e.g., two) drones instead of one. Because the computer 74 follows substantially the same steps in the single-user mode as in the two-user mode, the amount of programming required for the simulator 10 is minimized.

In the single user mode, the user of the simulator 10 can sit in either the seat 12 or the seat 14 and operate the simulator 10. For clarity of disclosure, in the discussion below, the simulator 10 is operated in the single-user mode from the seat 12 by a user (not shown).

Figure 4:
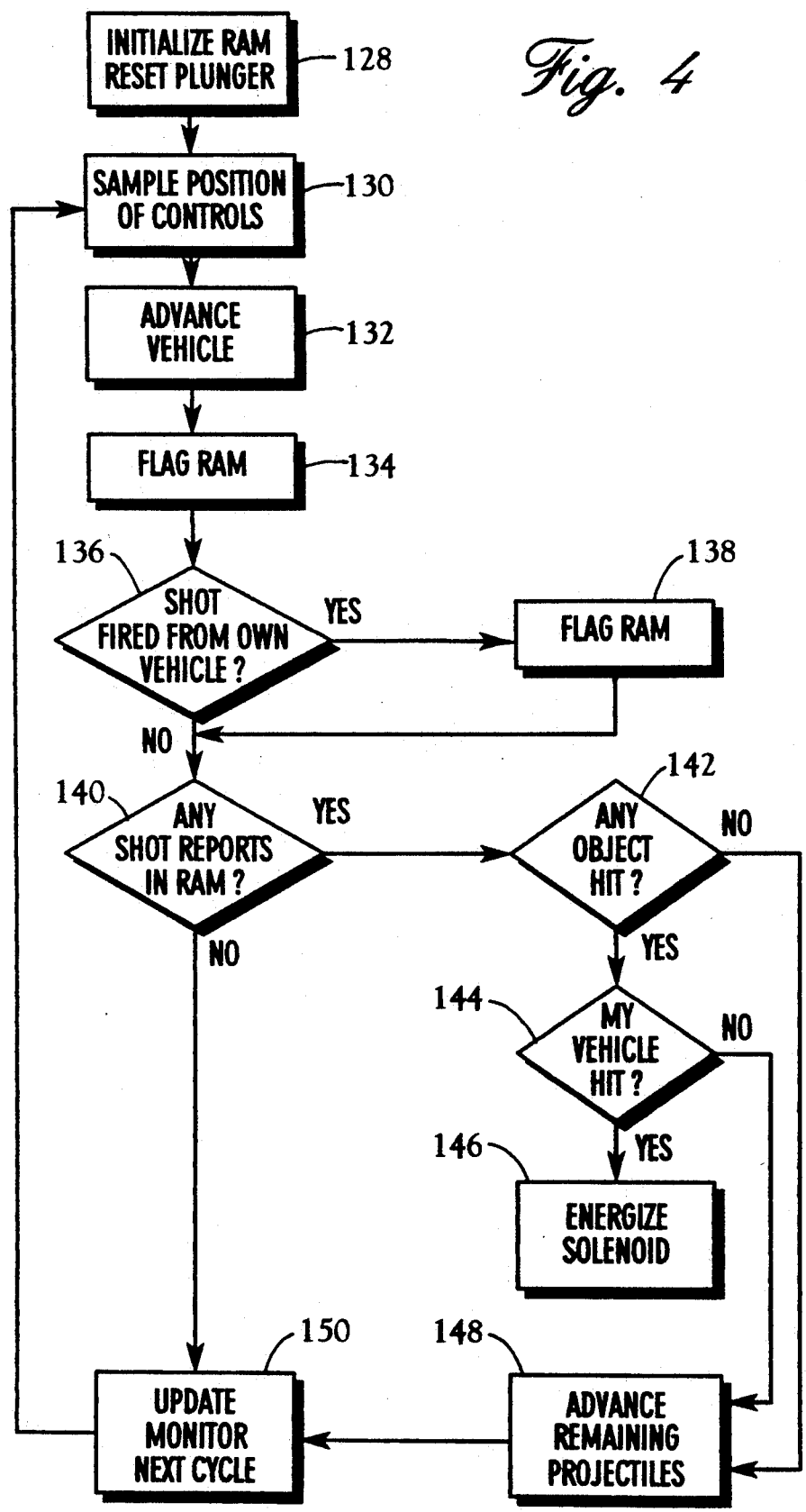
FIG. 4 is a flow chart showing the operation of a single computer of the novel vehicle simulator of the present invention during one computational cycle in the single-user mode.

Specifically, in reference to FIG. 4, as indicated at block 128, upon energization of the simulator 10 in the single-user mode, the common RAM 78 is initialized and the computer 74 signals the solenoid driver 80 to activate the power supply 82 to move the plunger 30 of the solenoid 26 to its spaced positions. Then, the computer 74 proceeds to block 130, wherein the computer 74 samples the signals generated by the operator controls of the simulator 10.

More particularly, the user sitting in the seat 12 can manipulate the steering handle 62 and accelerator pedal 66 as appropriate to generate a control signal representative of the desired motion of the simulated vehicle 58, which is sampled by the computer at block 130. From block 130, the computer 74 moves to block 132, wherein the computer 74 advances the vehicle 58 in accordance with the control signals sampled at block 130. More specifically, based upon its input control signals, the computer 74 establishes the orientation and speed of its respective vehicle 58, and advances its vehicle 58 a distance corresponding to the product of the simulated speed of the vehicle 58 and the time period of one cycle, in a direction corresponding to the orientation of the vehicle 58. This data is stored in the electronic memory of the computer 74. Also, at block 132, the computer 74 advances the positions of two drone vehicles which are controlled by the computer 74 in accordance with a predetermined course of motion of the drones within the space 48.

The computer next moves to block 134, wherein the computer 74 stores the positions of the vehicle 58 and drones in the RAM 78. From block 134, the computer 74 moves to block 136, wherein the computer 74 samples the position of the trigger 90 to determine whether the vehicle 58 has fired a projectile. If the computer 74 determines that a projectile has been fired, the computer proceeds to block 138 and sends a signal representative of the position of trigger 90 to the RAM 78. The RAM 78 stores this data for subsequent access to the data by the computer 74. It will be understood that the signal representing the position of the trigger 90 is indicative of whether the user initiated the firing of a projectile from the vehicle 58 toward one of the drones.

From block 138 or block 136, the computer 74 next proceeds to block 140, wherein the computer 74 determines whether any projectiles exist within the space 48. While in block 140, the computer 74 at any time can, if desired, initiate a projectile firing from one or both of the drones toward the vehicle 58. At block 140, the computer 74 polls the RAM 78 to determine whether any projectiles are currently "active". Specifically, at block 140, the computer 74 polls the RAM 78 to determine whether any shot was fired by any of the computer-controlled drones, or by the vehicle 58 controlled by the computer 74, either in the current computational cycle or in any previous computational cycles. More specifically, each projectile that has been fired has a predetermined "lifetime", i.e., each projectile can exist for a predetermined number of computational cycles after it has been fired, after which time the projectile is deleted from the space 48. In accordance with the present invention, the computer 74 stores, in its memory, the positions of the projectiles obtained from the RAM 78.

In the event that the computer 74 determines, at block 140, that one or more projectiles exist in the space 48, the computer 74 moves to block 142. At block 142, the computer 74 determines whether any projectiles have hit any "allowed" objects in the space 48. More particularly, the computer 74 ascertains the firing platform of each projectile, and then compares the position of each projectile in the space 48 with the position of each object in the space 48, including the vehicle 58 and computer-controlled drones, that is "allowed" to be hit by the particular projectile. In accordance with the present invention, a projectile is "allowed" to hit one of the computer-controlled drones. A projectile is not, however, allowed to hit the vehicle which fired the particular projectile.

To determine whether the projectile has hit an "allowed" object, the computer 74 in block 142 compares the position of the projectile with the positions of the drone vehicles. If any portion of the projectile coincides with any portion of an allowed object, the computer 74 registers a hit on the particular object and stores the hit registration in memory.

In the event that the computer 74 determines that a hit has occurred, the computer 74 moves to block 144. At block 144, the computer 74 determines whether the hit object was the vehicle 58. If the hit object was the vehicle 58, the computer 74 moves to block 146, wherein the computer 74 causes the solenoid 26 to be energized. More specifically, the computer 74 sends a signal through the RAM board 77 to the solenoid driver 81, to cause the solenoid driver 81 to activate the power supply 82. When power supply 82 is activated to energize the solenoid 26, the plunger 30 is moved from its spaced position to its impact position to strike the wooden block 34. The impact of the plunger 30 against the block 34 is transferred to the seat 12, to give the user who is sitting in the seat 12 a sensation of being thumped.

From block 146, or block 144 if the vehicle 58 has not been hit, or block 142 if no object was hit, the computer 74 proceeds to block 148. At block 148, the computer 74 conducts calculations and produces data which advances the positions of any projectiles remaining in the space 48 a distance from the projectile's last position corresponding to the simulated speed of the projectile multiplied by the time period of one game cycle, in a direction corresponding to the orientation of the projectile. In other words, the computer 74 advances the positions of all fired projectiles which have not hit an "allowed" object in the space 48 and have not exceeded their lifetimes.

From block 148, or, if no shot reports have been reported in the RAM 78, from block 140, the computer 74 proceeds to block 150. At block 150, the computer 74 updates the monitor 42 to reflect the determinations and calculations conducted by the computer 74 in the computational cycle. After the computer 7 has updated the monitor 42 at block 150, the computer 74 commences another computational cycle by returning to block 128.

While the novel vehicle simulator with cross-feedback as disclosed herein is fully capable of achieving the stated objectives, it is to be understood that nothing shall be construed as a limitation of the present invention, other than the limitations set forth in the appended claims.

We claim:

1. A vehicle simulator for modelling motion of a first simulated vehicle through a simulated space having simulated objects therein, which comprises:
    a first surface positionable in physical contact with a first user of said simulator for supporting the first user;
    a first solenoid having a plunger movable between a spaced position, wherein said plunger is distanced from said first surface, and an impact position, wherein said plunger contacts said first surface;
    a first video monitor; and
    a first computer for modelling motion of said vehicle through said space, wherein said first computer is electrically connected to said video monitor to cause said monitor to display a changing video image of said simulated space, said image corresponding to a view from said vehicle, said computer being electrically connected to said solenoid to cause said plunger to move from said spaced position to said impact position to contact said first surface and communicate an impact sensation to said first user when the position of a portion of one of said simulated objects coincides with the position of a portion of said simulated vehicle in said simulated space.

2. The simulator as recited in claim 1, further comprising first control means operatively engaged with said first computer and movable by the user to control the motion of said first simulated vehicle through said simulated space.

3. The simulator as recited in claim 2, wherein at least one of said simulated objects is a simulated projectile, and the simulated motion of said simulated projectile through said space is initiated by said first computer.

4. The simulator as recited in claim 2, wherein said simulator further comprises a second computer for modelling the motion of a second simulated vehicle through said space, said second computer being electrically connected to said first computer and having second control means operatively engaged therewith for manipulation of said second control means by a second user to initiate the motion of a preselected one of said simulated objects through said simulated space.

5. The simulator as recited in claim 4, further comprising:
    a second surface positionable in physical contact with the second user of said simulator for supporting the second user;
    a second video monitor electrically connected to said second computer for presenting a changing video image of said simulated space in response to said second computer; and
    a second solenoid having a second plunger movable between a spaced position, wherein said plunger is distanced from said second surface, and an impact position, wherein said second plunger contacts said second surface, said second solenoid being electrically connected to said second computer, wherein the motion of a predetermined one of said simulated objects through said space is initiated by the first user for causing said second plunger to move from said spaced position to said impact position to contact said second surface and communicate an impact sensation to said second user when the position of a portion of said predetermined simulated object coincides with the position of a portion of said second simulated vehicle in said simulated space.

6. The simulator as recited in claim 5, further comprising a random access memory (RAM) electrically connected to said computers for electronically storing and relaying data representative of the initiation of said motion of said preselected and predetermined simulated objects through said simulated space and for storing and relaying data representative of the positions and motion of said first and second simulated vehicles through said space.

7. A user-interactive vehicle simulator, comprising:
   a first video monitor;
   a first computer electrically connected to said monitor for causing said monitor to present a changing video image of a simulated space to model the motion through said space of a first simulated vehicle, said space including simulated movable objects therein;
   a first control means operatively engaged with said first computer and movable by a first user of said simulator for controlling the motion of said first simulated vehicle through said simulated space; and
   first impact means in physical contact with the user of said simulator and electrically connected to said first computer for communicating a tactile sensation to the user when the position of a portion of said simulated vehicle coincides with the position of a portion of one of said objects in said simulated space.

8. The simulator as recited in claim 7, wherein said first impact means includes a first seat for supporting the first user and a first solenoid having a first plunger movable from a spaced position, wherein said first plunger is distanced from a surface, and an impact position, wherein said first plunger contacts said surface.

9. The simulator as recited in claim 8, wherein said one of said objects is a simulated projectile, and the simulated motion of said projectile through said space is initiated by said first computer.

10. The simulator as recited in claim 8, wherein said simulator further comprises a second computer electrically connected to said first computer and having second control means operatively engaged therewith for manipulation of said second control means by a second user to initiate motion of a preselected one of said simulated movable objects through said simulated space.

11. The simulator as recited in claim 10, further comprising:
    a second surface for supporting the second user;
    a second video monitor electrically connected to said second computer for presenting a changing video image of said simulated space in response to said second computer to model the motion of a second simulated vehicle through said space; and
    a second solenoid having a second plunger movable from a spaced position, wherein said second plunger is distanced from said second surface, and an impact position, wherein said second plunger contacts said second surface, said second solenoid being electrically connected to said second computer, wherein the motion of a predetermined one of said simulated objects through said space is initiated by the first user for causing said second plunger to move from said spaced position to said impact position to contact said second surface when the position of a portion of said predetermined simulated object coincides with the position of a portion of said second simulated vehicle in said simulated space.

12. The simulator as recited in claim 11, further comprising a random access memory (RAM) electrically connected to said computers for electronically storing and relaying data representative of the initiation of said motion of said preselected and predetermined simulated objects through said simulated space and for storing and relaying data representative of the positions and motion of said first and second simulated vehicles through said space.

13. A method for modelling the motion of a first simulated vehicle through a simulated space having simulated objects therein, which comprises the steps of:
    providing a simulator which includes:
      a first video monitor;
      a first computer electrically connected to said monitor for causing said monitor to present a changing video image of said simulated space to model the motion of said simulated vehicle through said simulated space, said computer having control means operably engaged therewith and said computer being manipulable by a first user to control the motion of said first simulated vehicle through said simulated space; and
    physically impacting the user in response to a signal generated by said computer when the position of a portion of said vehicle in said simulated space is generated by said first computer, and wherein said position of said vehicle coincides with the position of a portion of one of said objects generated by said first computer in said simulated space.

14. The method as recited in claim 13, wherein the motion of a preselected one of said objects through said space is initiated by said first computer.

15. The method as recited in claim 13, wherein the motion of a preselected one of said objects through said simulated space is initiated by a second computer, said second computer being manipulable by a second user.

16. A vehicle simulator for modelling motion of a first simulated vehicle through a simulated space having simulated objects therein, which comprises:
    a first surface positionable in physical contact with a first user of said simulator for supporting the first user;
    a first solenoid having a plunger movable between a spaced position, wherein said plunger is distanced from said surface, and an impact position, wherein said plunger contacts said surface;
    a first video monitor;
    a first computer for modelling motion of said vehicle through said space, wherein said first computer is electrically connected to said video monitor to cause said monitor to display a changing video image of said simulated space, said image corresponding to a view from said vehicle, said computer being electrically connected to said solenoid to cause said plunger to move from said spaced position to said impact position to contact said seat when a preselected one of said simulated objects coincides with a portion of said simulated vehicle in said simulated space wherein said preselected objects are simulated projectiles;
    first control means operatively engaged with said first computer and movable by the user to control the motion of said first simulated vehicle through said simulated space; and a second computer for modelling the motion of a second simulated vehicle through said space, said second computer being electrically connected to said first computer and having second control means operatively engaged therewith for manipulation of said second control means by a second user to initiate the motion of a preselected one of said projectiles through said simulated space.

17. The simulator as recited in claim 16, further comprising:

a second surface positionable in physical contact with the second user for supporting eh second user;

a second video monitor electrically connected to said second computer for presenting a changing video image of said simulated space in response to said second computer; and a second solenoid having a second plunger movable between a spaced position, wherein said plunger is distanced from said second surface, and an impact position, wherein said plunger contacts said second surface, said solenoid being electrically connected to said second computer, wherein the motion of a predetermined one of said simulated projectiles through said space is initiated by the first user for causing said second plunger to move from said spaced position to said impact position to contact said second surface when said predetermined simulated projectile coincides with a portion of said second simulated vehicle in said simulated space.

18. The simulator as recited in claim 17, further comprising:

a random access memory (RAM) electrically connected to said computers for electronically storing and relaying data representative of the initiation of said motion of said preselected and predetermined simulated projectiles through said simulated space and for storing and relaying data representative of the positions and motion of said first and second simulated vehicles through said space.

19. A user-interactive vehicle simulator, comprising:

a first video monitor;

a first computer electrically connected to said monitor for causing said monitor to present a changing video image of a simulated space to model the motion through said space of a first simulated vehicle, said space including simulated movable objects therein;

first control mans operatively engaged with said computer and movable by a first user of said simulator for controlling the motion of said vehicle through said space;

first impact means in physical contact with the user of said simulator and electrically connected to said computer for communicating a tactile sensation to the user when the position of a portion of said simulated vehicle coincides with the position of a portion of one of said objects in said simulated space, wherein said first impact means includes a first seat for supporting the first user and a first solenoid having a plunger movable from a spaced position, wherein said plunger is distanced form a surface, and an impact position, wherein said plunger contacts said surface; and a second computer electrically connected to said first computer and having second control means operatively engaged therewith for manipulation of said second control means by a second user to initiate the motion of said preselected projectile through said simulated space.

20. The simulator as recited in claim 19, further comprising:

a second surface for supporting the second user;

a second video monitor electrically connected to said second computer for presenting a changing video image of said simulated space in response to said second computer to model the motion of a second simulated vehicle through said space; and a second solenoid having a second plunger movable from a spaced position, wherein said plunger is distanced from said second surface, and an impact position, wherein said plunger contacts said second surface, said solenoid being electrically connected to said second computer, wherein the motion of a predetermined one of said simulated projectiles through said space is initiated by the first user for causing said second plunger to move from said spaced position to said impact position to contact said second surface when said predetermined simulated projectile coincides with said second simulated vehicle in said simulated space.

21. The simulator as recited in claim 20, further comprising:

a random access memory (RAM) electrically connected to said computers for electronically storing and relaying data representative of the initiation of said motion of said preselected and predetermined simulated projectiles through said simulated space and for storing and relaying data representative of the positions and motion of said first and second simulated vehicles through said space.

* * * * *

UNITED STATES PATENT AND TRADEMARK OFFICE
CERTIFICATE OF CORRECTION

PATENT NO. : 5,299,810
DATED : April 5, 1994
INVENTOR(S) : Mark Stephen Pierce, et al It is certified that error appears in the above-indentified patent and that said Letters Patent is hereby corrected as shown below:

Column 15, line 12, change "eh" to --the--

Column 16, line 12, "form" to --from--

Signed and Sealed this

Twenty-seventh Day of September, 1994

Attest:

BRUCE LEHMAN

Attesting Officer     Commissioner of Patents and Trademarks